C. B. MARTIN & W. SPERRY.
FANNING MILL.
No. 249,780. Patented Nov. 22, 1881.
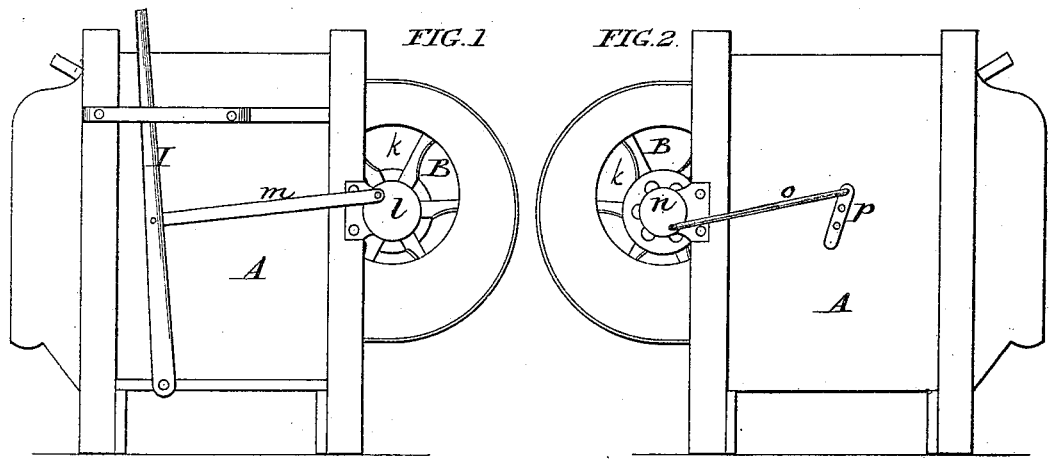
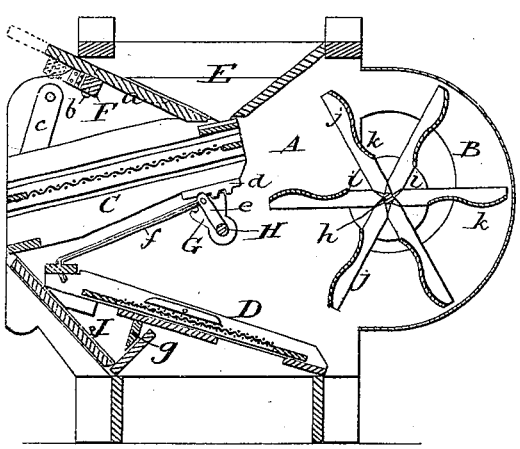
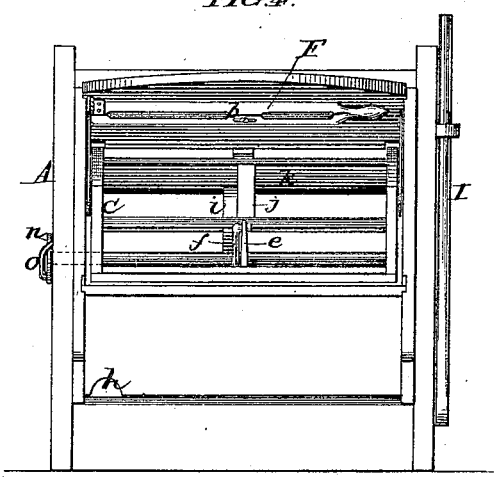
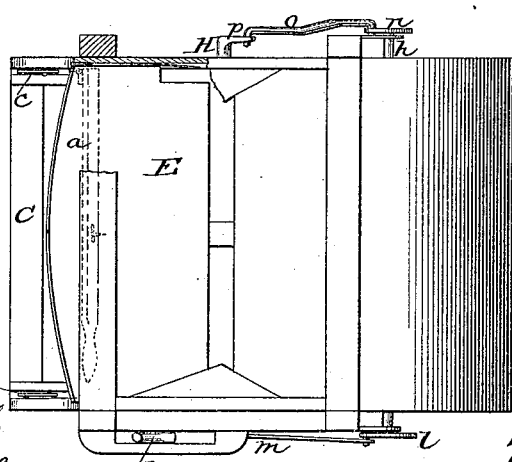
Witnesses.
Sidney P. Hollingsworth
William W. Dodge
Inventors.
C. B. Martin
Willis Sperry
By Dodge & Son
Attys

UNITED STATES PATENT OFFICE.

CHARLES B. MARTIN AND WILLIS SPERRY, OF WAUPUN, WISCONSIN.

FANNING-MILL.

SPECIFICATION forming part of Letters Patent No. 249,780, dated November 22, 1881.

Application filed February 10, 1880.

*To all whom it may concern:*

Be it known that we, CHARLES B. MARTIN and WILLIS SPERRY, of Waupun, in the county of Fond du Lac and State of Wisconsin, have invented certain Improvements in Fanning-Mills, of which the following is a specification.

Our invention relates to that class of grain cleaners and separators commonly known as "fanning-mills," wherein reciprocating screens are employed in connection with a blast-fan.

The invention consists in certain peculiarities of construction hereinafter described.

Figure 1 is a side elevation of our machine, showing the hand-lever by which it is driven; Fig. 2, a view looking from the opposite side of the machine; Fig. 3, a vertical central section, looking longitudinally through the machine; Fig. 4, a rear-end elevation, and Fig. 5 a top-plan view.

Our machine consists, like others of its class, of a closed body containing a series of reciprocating screens, a fan for producing a blast of air past said screens, and a hopper at the top, through which the material is delivered to the screens.

A represents the upright body of the machine; B, the revolving fan, mounted on a horizontal shaft, $h$, as usual, in one end of the body. The fan has its blades $j$ constructed with a double or ogee curvature, as clearly represented in Fig. 3, each blade being made concave at the inner and convex at the outer edge. The blades of the fan are supported at the center by means of a disk or spider, $i$, mounted upon the fan-shaft.

Air is admitted, as usual, through openings $k$ in the side of the body at the ends of the fan. These openings, instead of being of the usual form, are arranged eccentrically with reference to the axis of the fan, and diminish in width from their upper to their lower ends, as clearly represented in Figs. 1, 2, and 3.

In practice it has been found that the fan constructed as described and combined with the eccentric openings acts with far better effect than those constructed in the ordinary manner.

E represents the feed-hopper, located at the top of the machine to receive the grain and deliver the same to the screen, as usual. The hopper is provided in one side with a feed-regulating slide, $a$, the position of which is controlled by means of a hand-lever, F, lying transversely beneath the slide, to which it is connected by a central pivot, $b$. One end of the lever F is pivoted to the rear side of the main frame, while the other end lies near the rear of the frame, in position to be readily grasped and operated by the attendant, when driving the machine, by a second lever, hereinafter described.

C represents the upper shoe or screen-frame, mounted, as usual, in an inclined position, with its upper end beneath the mouth of the hopper. This frame is sustained at one end by pivoted pendent links, $c$, and is sustained at the opposite end by sector-pinions G, mounted on the ends of a horizontal shaft, H. The pinions engage in racks $d$, secured to the upper end of the screen, and serve both as a rolling support for the screen and as a means of imparting reciprocating motion thereto.

The shaft H is provided at the center with an arm, $e$, connected by a rod, $f$, to the upper end of the lower screen-frame, D, lying in the base of the machine. One end of the shaft H is extended through the side of the body and provided with an arm, $p$, through which it receives motion by a connecting-rod, $o$, from a crank-wheel, $n$, mounted on one end of the main fan-shaft.

Motion is communicated to the fan, and thence to the other moving parts of the machine, by means of an upright hand-lever, I, pivoted to one side of the body, and connected by a rod, $m$, with a crank-wheel, $l$, on one end of the fan-shaft. The driving-lever I is mounted in an upright position, with its upper end extending above the body and lying near the feed-regulating lever F, so that the attendant, standing at one side of the machine, may operate the driving-lever I with one hand, and at the same time control the feed-lever with the other hand. This peculiar arrangement of the parts with relation to each other is of importance, in that it gives the attendant perfect control of the machine.

It will be seen that motion is communicated from the fan-shaft through the link $o$ to the rock-shaft H; that the latter communicates motion to both of the screen-frames C and D.

Beneath the upper end of the lower screen we construct the transverse delivery trough or spout J. The grain falling through the upper screen will fall partially upon the latter and partially within the trough, according to the adjustment of the lower screen, the blast of the fan tending to drive the grain into the trough.

The screen-frame D is arranged to slide endwise, in order that it may be adjusted to secure a proper separation and delivery of the grain.

An inclined board, g, is attached to the under side of the screen-frame D and lies in one side of the trough, as represented in Fig. 3. This board serves as an agitator, and, because of its inclined position, as a delivery device to insure the discharge of the grain from the trough.

We are aware that fanning-mills have been made in a great variety of forms, that various devices have been used for operating them, and that hand-levers have been used for operating various classes of machinery.

The present invention is restricted to those matters and things which are specifically claimed herein, and as to all other matters and things which may be shown or described herein the right is reserved to make them the subject-matter of a separate application.

What we claim as our invention is—

The combination of the shaking-screen, the transverse trough thereunder, and the agitator g, attached to the under side of the screen and extending downward into the trough, said agitator being arranged at an inclination at the side of the trough, as described, whereby it is caused to urge the grain forward.

CHARLES B. MARTIN.
WILLIS SPERRY.

Witnesses:
W. H. TAYLOR,
S. J. MORSE.